UNITED STATES PATENT OFFICE.

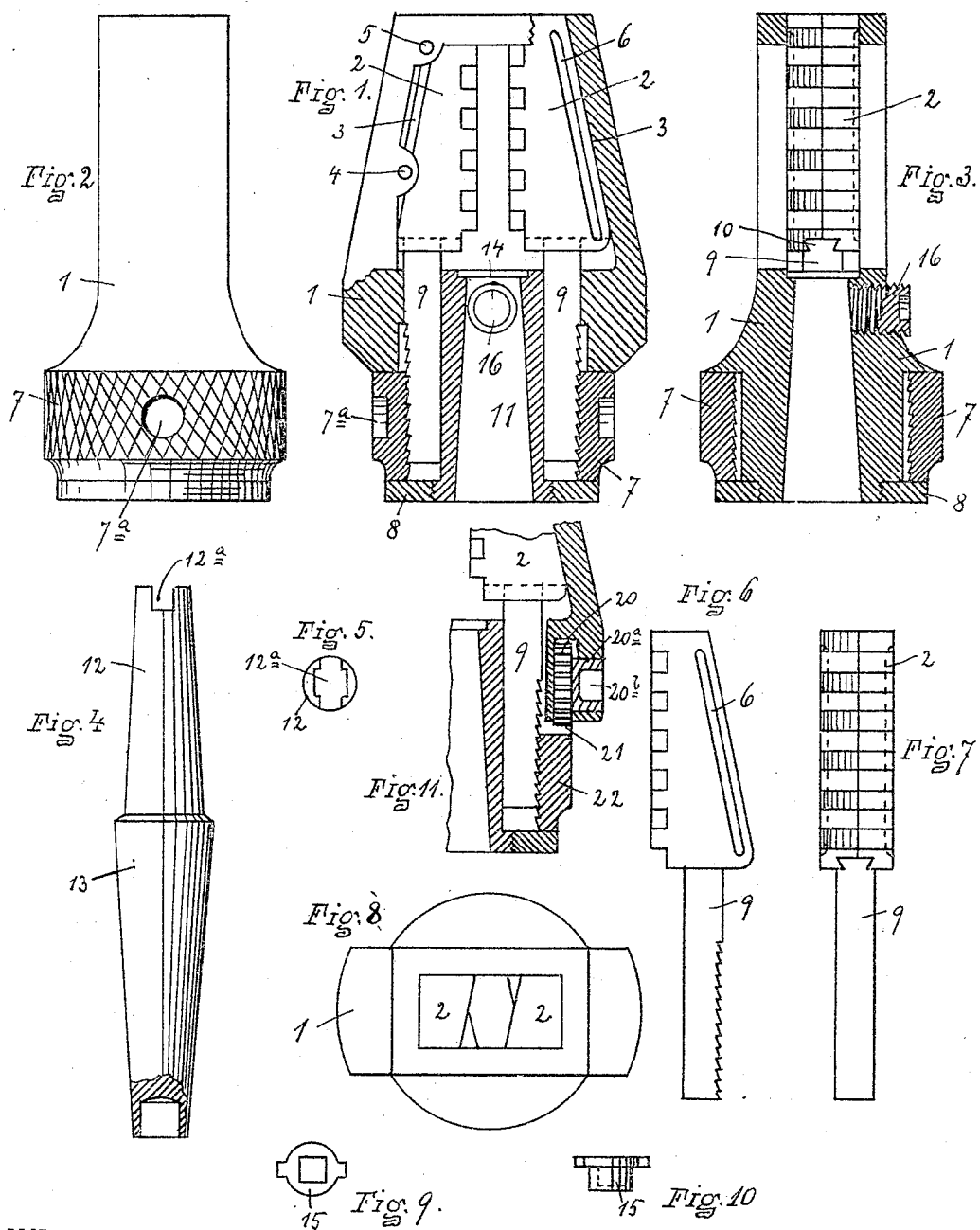

NICHOLAS DREW, OF ONEIDA, NEW YORK, ASSIGNOR TO HERMAN M. REYNOLDS, OF ONEIDA, NEW YORK.

DRILL-CHUCK.

955,326.  Specification of Letters Patent.  Patented Apr. 19, 1910.

Application filed December 26, 1906. Serial No. 349,594.

*To all whom it may concern:*

Be it known that I, NICHOLAS DREW, of Oneida, in the county of Madison and State of New York, have invented certain new and useful Improvements in Drill-Chucks; and I do hereby declare that the following is a full, clear, and exact description thereof, which will enable others skilled in the art to which it appertains to make and use the same, reference being had to the accompanying drawings, and to the numerals of reference marked thereon, which form part of this specification.

The object of my invention is to provide a drill chuck which is simple in construction and efficient in operation, and which has numerous features of utility which add largely to its usefulness.

Figure 1 shows a partial longitudinal section of the chuck, and a partial side elevation of same. Fig. 2 shows a side elevation. Fig. 3 shows a longitudinal section on a plane at right angles to the plane of the section shown in Fig. 1. Fig. 4 shows a spindle on which the chuck is adapted to be mounted in a lathe or other machine. Fig. 5 shows an end view of the spindle shown in Fig. 4. Figs. 6 and 7 show side and edge views of the jaws, including the jaw moving bars or rods. Fig. 8 shows an end view of the chuck as seen from the upper end of either of Figs. 1 or 2. Figs. 9 and 10 show bushings employed in the construction. Fig. 11 shows details of a modified form of construction.

Referring to the reference letters and figures in a more particular description, 1 indicates the body of the chuck which in part is cylindrical and in part is an open frame substantially axially arranged with reference to the cylindrical portion. The frame portion receives the movable jaws 2—2, which are of substantially triangular form and mounted on converging slide-ways 3 therein, and are held in position on the slide-ways by screws 4—5 engaging in longitudinal grooves 6 on either side of the jaws.

The cylindrical portion of the chuck body is formed to receive the rotatable, internally screw-threaded ring 7, the same being held in place by a nut 8 screw-threaded onto the end of the body and held against lateral movement. Passing through suitable openings or slide-ways in the body are the jaw operating bars 9, which are attached to the jaws by means of a dove-tailed slide 10 and are provided with screw-threads engaging with the rotatable ring 7. The external surface of the ring 7 will preferably be knurled to adapt it to be turned readily by the hand, and provided with sockets 7ª for the reception of a spanner wrench by which the ring may be rotated with much more power. The cylindrical portion of the chuck body is provided with a tapering socket 11 adapted to receive the tapering end 12 of the spindle 13, the opposite end of the spindle 13 being adapted to be inserted in a lathe spindle or the spindle of any other suitable machine.

The end of the spindle 13, which is received in the socket 11, is provided with a recess 12ª, which, when the spindle is in position is adapted to receive the inner end of a drill inserted in the jaws and serve as a positive drive for the drill. At the inner end of the socket 11 there is also provided a recess 14 adapted to receive when required a bushing 15, which bushing is also provided with an opening adapted to receive in a similar manner the inner end of a drill when in position in the chuck. When the bushing 15 is employed a spindle somewhat shorter as to its conical portion 12 and without a recess in the end thereof, will preferably be employed.

A set screw 16 is provided, which is particularly adapted to secure the bushing 15 in position when the bushing is used, and may also be employed to engage with the spindle 12 in securing the chuck on the spindle, although this will not ordinarily be required, as the chuck, if the taper of the spindle is correct, should maintain its position by friction.

It will be noted that as the screw-threaded ring 7 is rotated in one direction the jaw 2 will be moved outwardly longitudinally with reference to the chuck, and being mounted on converging slides will close together and grip a drill or other piece inserted between the jaws. Also, when the ring 7 is rotated in the opposite direction the jaws will be drawn inwardly longitudinally and opened. As the jaws 2 move longitudinally they will slide transversely on the dove-tail joint 10 between the jaw and the end of the operating bars 9.

In Fig. 11 an additional means for rotating the ring 7 is shown as being provided.

This consists of a gear pinion 20 contained in a suitable recess in the body, and having its teeth meshing with a row of teeth 21 provided on the inner end of the screw-threaded ring 22, which is a modification of the ring 7 of the prior construction. The pinion 20 is provided with an enlarged hub 20ª, which forms more particularly the bearing for the pinion, and this hub is provided with a square socket 20ᵇ adapted to receive an ordinary square bitted chuck wrench. By means of the wrench the pinion 20 may be rotated in either direction, and through the medium of the pinion the screw-threaded ring 22 is operated, a certain amount of leverage being secured, and the power applied transversely to the ordinary plane of rotation of the chuck when mounted in a lathe or other machine.

It is evident that numerous modifications and changes in and from the construction herein described may be made without departing from the spirit of my invention.

What I claim as new and desire to secure by Letters Patent is:

The combination in a drill chuck of a skeleton body having two opposed converging jaw slideways and two parallel longitudinal bar slide-ways, slotted jaws slidingly mounted in said slideways, guiding means carried by said body and entering the slots in said jaws, operating bars mounted in said operating bar slideways and connected to the jaws respectively and externally screw-threaded, a rotatable internally screw-threaded ring mounted on the body and held from lateral movement and engaging with said operating bars, substantially as set forth.

In witness whereof, I have affixed my signature, in presence of two witnesses, this 15th day of December 1906.

NICHOLAS DREW.

Witnesses:
 M. H. COLWAY,
 E. R. SMITH.